United States Patent
Schmitt

(10) Patent No.: US 9,533,645 B2
(45) Date of Patent: Jan. 3, 2017

(54) ROLLOVER PROTECTION SYSTEM FOR A MOTOR VEHICLE

(71) Applicant: Dr. Ing. h.c. F. Porsche Aktiengesellschaft, Stuttgart (DE)

(72) Inventor: Hans-Juergen Schmitt, Muehlacker (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 15/069,111

(22) Filed: Mar. 14, 2016

(65) Prior Publication Data
US 2016/0288754 A1    Oct. 6, 2016

(51) Int. Cl.
*B60R 21/13* (2006.01)
*B60R 21/00* (2006.01)
*B60R 21/02* (2006.01)

(52) U.S. Cl.
CPC ........ *B60R 21/13* (2013.01); *B60R 2021/0018* (2013.01); *B60R 2021/0048* (2013.01); *B60R 2021/0273* (2013.01)

(58) Field of Classification Search
CPC ............ B60R 21/13; B60R 2021/0018; B60R 2021/0048; B60R 2021/0273
USPC ........................................................ 280/756
See application file for complete search history.

(56) References Cited

U.S. PATENT DOCUMENTS

| | | | | |
|---|---|---|---|---|
| 5,056,816 A | * | 10/1991 | Lutze | ...................... B60N 2/487 280/751 |
| 5,273,314 A | * | 12/1993 | Sakakibara | ........... B60R 21/045 188/377 |
| 6,817,628 B2 | * | 11/2004 | Hovelmann | ............ B60R 21/13 188/377 |
| 7,651,131 B2 | * | 1/2010 | Kohlem | ................... B60R 21/13 280/756 |
| 2006/0290124 A1 | * | 12/2006 | Kasubke | ................. B60R 21/13 280/756 |

(Continued)

FOREIGN PATENT DOCUMENTS

| DE | 102 23 420 | 3/2003 |
|---|---|---|
| DE | 10218701 | 6/2003 |

(Continued)

OTHER PUBLICATIONS

German Search Report of Jan. 13, 2016.
Combined Search and Examination Report dated Jul. 28, 2016.

*Primary Examiner* — Faye M Fleming
(74) *Attorney, Agent, or Firm* — Gerald E. Hespos; Michael J. Porco; Matthew T. Hespos

(57) ABSTRACT

A rollover protection system for a motor vehicle has a deformation crossbar (2) with a profiled strut (3) extending along a vertical axis (6) of the vehicle, and a deformation element (4) is held at a first end (9) of the profiled strut (3). The first end (9) faces away from a floor of the motor vehicle. The deformation element (4) has a first outer surface (11) that faces away from the profiled strut (3) to define an impact surface, and the deformation element (4) is designed as a strut profile extending in the direction of a longitudinal axis (8) of the motor vehicle. The profiled strut (3) has a contact surface (10) that faces the deformation element (4) and on which the deformation element (4) is held. The deformation element (4) is designed to at least partially match an inner contour of the motor vehicle.

20 Claims, 3 Drawing Sheets

(56) References Cited

U.S. PATENT DOCUMENTS

2009/0095554 A1* 4/2009 Pedersen ................ B60R 21/13
180/282

FOREIGN PATENT DOCUMENTS

| DE | 102 10 957 | 10/2003 |
| DE | 10 2005 029 253 | 12/2006 |
| DE | 10 2007 058 335 | 6/2009 |
| DE | 10 2009 011 066 | 9/2010 |
| DE | 10 2009 025 446 | 12/2010 |
| DE | 10 2009 039 215 | 3/2011 |
| DE | 10 210 005 811 | 7/2011 |
| GB | 2280456 | 2/1995 |
| WO | 2010149659 | 12/2010 |

* cited by examiner

ROLLOVER PROTECTION SYSTEM FOR A MOTOR VEHICLE

CROSS REFERENCE TO RELATED APPLICATION

This application claims priority under 35 USC 119 to German Patent Appl. No. 10 2015 105 091.9 filed on Apr. 1, 2015, the entire disclosure of which is incorporated herein by reference.

BACKGROUND

1. Field of the Invention

The invention relates to a rollover protection system for a motor vehicle.

2. Description of the Related Art

Rollover protection systems for motor vehicles are known. The rollover protection systems customarily are accommodated more or less invisibly in a body of the motor vehicle during normal operation and are extended from the body only in the event of a situation differing from the normal operation of the motor vehicle, for example a crash situation. The rollover protection systems have latching devices to maintain a distance of a vehicle inner surface from an impact surface.

DE 102 10 957 C1 discloses a rollover protection system with leg tubes that are extendable from a cassette and are connected to one another at the end thereof formed facing away from the cassette with the aid of a clip head. The clip head has an integral extension to enlarge a supporting surface.

DE 102 23 420 C2 discloses a rollover protection system with profiled struts that are extendable from a cassette. A deformation element is held at the end of the profiled struts for absorbing a force, such as an impact force. Therefore a force acting on a latching device of the rollover protection system is reduced. This results in the possibility of the rollover protection system remaining in the extended end position thereof after the action of force. The deformation element is designed in the form of a strut profile and extends in the strut extent thereof in the direction of a transverse axis of the vehicle.

DE 10 2007 058 335 A1 discloses a rollover protection system with a rollover body at the end of profiled struts. A deformation element is formed independently of the rollover body and is arranged in the region of a latching strip that extends in the direction of a longitudinal axis of the profiled struts.

DE 10 2010 005 811 A1 discloses a rollover protection system with a profiled strut having an open end that is closed with a deformation element. The deformation element is designed in the form of a strut profile and extends in the direction of the strut extent thereof in the direction of a longitudinal axis of the vehicle.

A correspondingly oriented deformation element can also be gathered from laid-open application DE 10 2009 011 066 A1 discloses a rollover protection system with profiled struts and a deformation element that protrudes over the profiled struts in the direction of the transverse axis of the vehicle.

DE 10 2005 029 253 B4 discloses deformation elements that have an impact surface or supporting surface that is enlarged in relation to a cross-sectional area of the profiled struts. The rollover protection system disclosed there also has one of the deformation elements at each of the open ends of the profiled struts. The deformation elements are hollow bodies with cavities extending in the direction of the longitudinal axis of the vehicle.

It is the object of the invention to provide a rollover protection system for a motor vehicle with deformation elements that have improved absorption of force.

SUMMARY

The rollover protection system for a motor vehicle according to the invention has a deformation crossbar with a profiled strut extending along a vertical axis of the motor vehicle. The profiled strut has a first end facing away from the vehicle floor and a deformation element is accommodated at the first end of the profiled strut. The deformation element has an impact surface at a first outer surface facing away from the profiled strut and is designed in the form of a strut profile extending in the direction of a longitudinal axis of the motor vehicle. The profiled strut has a contact surface facing the deformation element and on which the deformation element is held. The deformation element is designed to at least partially match an inner contour of the motor vehicle.

The deformation element is configured to absorb an impulse force and is provided for protecting the profiled strut and a latching device. The impulse force is intended to be absorbed as fully as possible by the deformation element, and therefore the profiled strut and the latching device are deformed to the least possible extent, and preferably not at all. The deformation element may be matched to the inner contour of the motor vehicle and therefore realizes an extensive support and also stabilization of the body structure of the inner contour of the motor vehicle, for example a C pillar or a folding top of the motor vehicle.

Every body shape has individual stability. Thus, for example, a convertible is designed differently for stability behavior than, for example, a saloon. Also, a "notch back body" has different stability behavior than a "coupe" or a "station wagon". Therefore, with individual matching of the deformation element to the inner contour of the motor vehicle, i.e. an imitation of a corresponding inner surface of the motor vehicle, the individual stability behavior of the motor vehicle body is supported in a controlled manner. In other words, the original stability behavior of the motor vehicle body after the action of, for example, an impact force can be very substantially imitated because of the deformation element that is matched to the inner contour of the motor vehicle.

The deformation element may be an extruded component to achieve a cost-effective production. More particularly, the deformation elemeny may be a light metal component that is made, for example, from aluminum.

Alternatively, the deformation element may be a forged part with corresponding ribbing, or a cast part.

The first outer surface may protrude over the contact surface, thereby further enlarging the impact surface. This can be realized by having the first outer surface protrude in the direction of an interior of the motor vehicle and/or in the direction facing away from the interior.

An additional enlargement of the impact surface can also be realized in a simple manner by having the first outer surface protrude over the contact surface in the direction of the longitudinal axis of the vehicle.

The deformation element may be a hollow body having chambers, thereby reducing weight while simultaneously increasing an elastic deformation behavior.

An increase in the impulse force absorption capability is obtained by forming the chambers separately from one another with the aid of walls extending at an inclination in relation to a normal of a longitudinal axis of the profiled strut. The increase is formed if the inclination has an angle of greater than or equal to 45° in relation to the normal.

In a further refinement, a support wall extends parallel to a floor surface of the vehicle at least partially connects the walls. Thus, the force portions that after action of a force on the impact surface are guided via the inclined walls and are oriented parallel to the floor surface of the vehicle. These force portions can be absorbed by the support wall, and therefore deformation in the direction of the vertical axis of the vehicle is reduced.

The deformation element may have a second outer surface that faces the profiled strut and that is connected to the contact surface in sections. Thus, only that section of the deformation element that is connected to the contact surface brings about a direct transmission of an impulse force to the profiled strut. That section of the deformation element which is not connected to the contact surface has the possibility of being deformed in a manner independent of the contact surface until there is contact with the contact surface. In particular, if a further chamber is formed between the second outer surface and the contact surface, there is complete contact between the contact surface and the second outer surface only after a distance between the second outer surface and the contact surface, which distance is brought about by the further chamber, is overcome. Deformation of the profiled strut is therefore reduced by this configuration.

An outer wall of the deformation element may be formed at an inclination in relation to a longitudinal axis of the profiled strut.

In a further refinement, the first outer surface protrudes over an outer wall of the deformation element. Thus, a further enlargement of the impact surface is possible. Furthermore, the protrusion of the outer surface matches the inner contour of the motor vehicle and results in the formation of a web that protrudes over the outer wall. The web shape forms an elastic substantially resilient part of the deformation element. Plastic deformation of the deformation element thus is reduced.

The deformation element may be connected integrally to the profiled strut, such as with a welded joint.

The deformation element may have a spike arranged on the first outer surface and disposed for safe piercing of a window, such as a rear window.

Further features, advantages and details of the invention emerge from the description below of preferred exemplary embodiments and with reference to the drawings. The features and combinations of features mentioned herein can be used in the respectively stated combination, and also in different combinations or on their own without departing from the scope of the invention. Identical or functionally identical elements are assigned identical reference numbers. For clarity reasons, it is possible that the elements are not provided with their reference numbers in all of the figures, but without the assignment thereof being lost.

DETAILED DESCRIPTION

Figure 1:
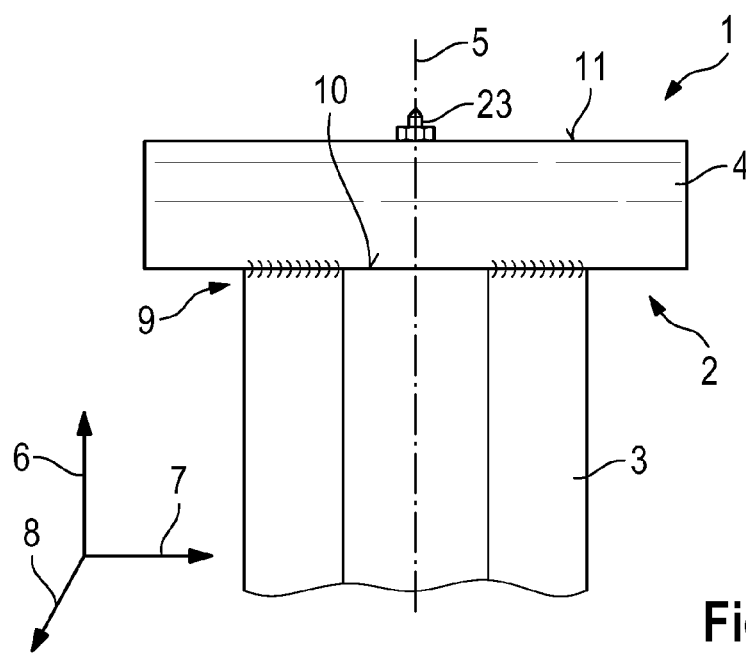
FIG. 1 is a front view a deformation crossbar of a rollover protection system according to the prior art.
Figure 2:
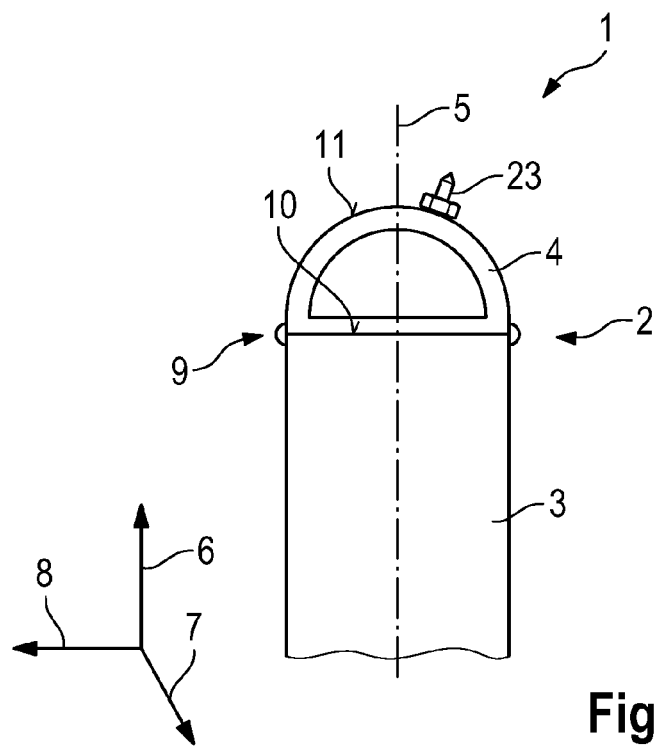
FIG. 2 is a side view of the deformation crossbar of FIG. 1.

A rollover protection system 1 from the prior art for a motor vehicle is designed in accordance with FIGS. 1 and 2. The rollover protection system 1 has a deformation crossbar 2 that comprises a profiled strut 3 and a deformation element 4 held on the profiled strut 3. The profiled strut 3 has a longitudinal axis 5 that corresponds in the direction of extension thereof substantially to a vertical axis 6 of the motor vehicle.

For improved explanation, the vertical axis 6 of the vehicle, a transverse axis 7 of the vehicle that is normal to the vertical axis 6, and a longitudinal axis 8 of the vehicle that is normal to the vertical axis 6 and to the transverse axis 7 are illustrated symbolically in the form of a Cartesian coordinate system symbol.

The deformation element 4 is arranged at a first end 9 of the profiled strut 3, which is the end facing away from a body floor surface (not illustrated specifically) of the motor vehicle. The deformation element 4 is designed in the form of a strut profile extending in the direction of the transverse axis 7 of the vehicle. The deformation element is produced as an extruded profile with a profile cross section of the deformation element 4 extending along the longitudinal axis 8 of the vehicle.

The profiled strut 3 has a contact surface 10 facing the deformation element 4 and on which the deformation element 4 is held.

Figure 3:
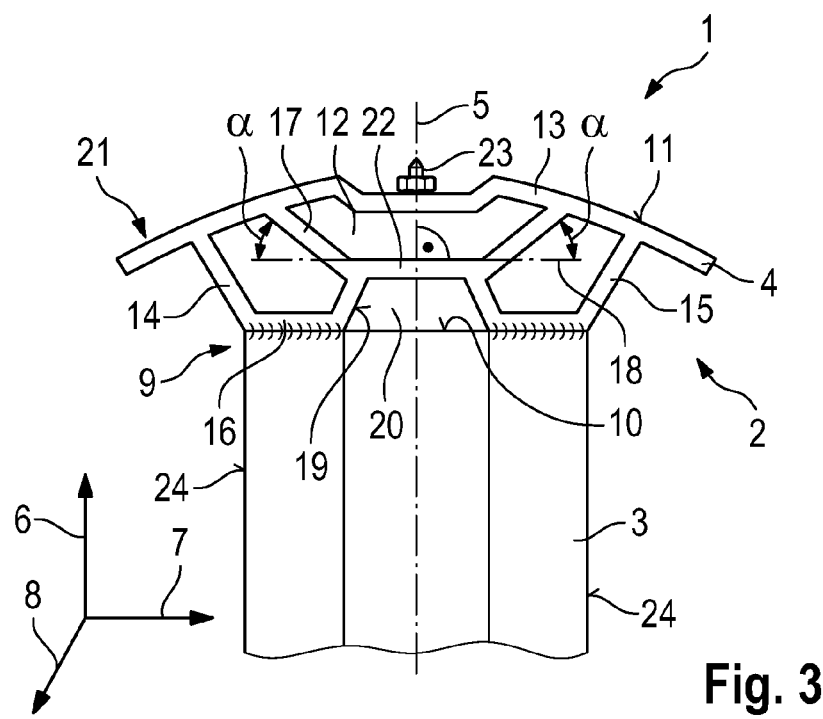
FIG. 3 is a front view of a deformation crossbar of a rollover protection system according to a first embodiment of the invention.
Figure 4:
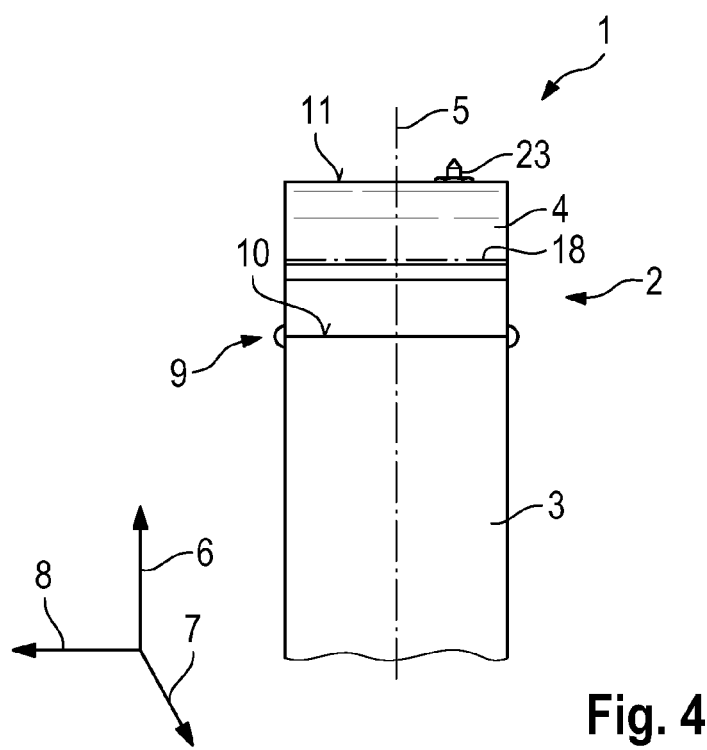
FIG. 4 is a side view of the deformation crossbar of FIG. 3.

A first embodiment of a rollover protection system 1 according to the invention is illustrated in FIGS. 3 and 4. The deformation element 4 is in the form of a strut profile extending in the direction of the longitudinal axis 8 of the vehicle. The deformation element is produced as an extruded component with the profile cross section extending in the direction of the transverse axis 7 of the vehicle.

The deformation element 4 has a first outer surface 11 that faces away from the contact surface 10 and has the function of an impact surface. The first outer surface 11 is matched to an inner contour (not illustrated specifically) of the motor vehicle or formed in a complementary manner with respect to the inner contour.

The deformation element 4 has a honeycomb-like cross-section with a hollow body and chambers 12. The illustrated chambers 12 are symmetrical with respect to the longitudinal axis 5. However, the chambers could be configured asymmetrically with respect to the longitudinal axis 5. This is dependent on the inner contour of the motor vehicle, to which inner contour the deformation element 4 is configured to match, and also depends on whether the two cassettes are formed symmetrically or identically and/or the angle at which the cassettes are situated in relation to each other.

The chambers 12 are delimited from the surroundings with the aid of a first outer wall 13, a second outer wall 14, a third outer wall 15 and a fourth outer wall 16. The first outer wall 13 has the first outer surface 11 facing away from the chambers 12. The second outer wall 14 and the third outer wall 15 delimit the deformation element 4 in the direction of the transverse axis 7 of the vehicle, while the fourth outer wall 16 is designed facing away from the first outer wall 13 and connects to the profiled strut 3.

The chambers 12 are separated from one another with the aid of walls 17 of the deformation element 4. The walls 17 are arranged at an inclination in relation to the longitudinal axis 5, and enclose an angle of, for example, 45°, to a normal 18 to the longitudinal axis 5.

The second and third outer walls 14 and 15 are arranged at an inclination in relation to the normal, with the inclination of the outer walls being dependent on the inner contour of the motor vehicle.

The first outer surface 11 protrudes over the contact surface 10 in the direction of the transverse axis 7 of the vehicle. In other words, the extent of the first outer wall 13 in the direction of the transverse axis 7 of the vehicle is greater than the extent of the contact surface 10. In this embodiment, the profiled strut 3 protrudes symmetrically over on the two side walls 24 thereof by the outer wall 13 and therefore also by the first outer surface 11. An asymmetrical or one-sided protrusion could also be formed depending on the inner contour of the motor vehicle. In particular, the first outer surface 11 extends over the contact surface 10 in the direction of an interior of the motor vehicle.

In the first exemplary embodiment, the extent of the first outer surface 11 in the direction of the longitudinal axis 8 of the vehicle ends flush with the contact surface 10. The first outer surface 11 could likewise protrude over the contact surface 10 in the direction of the longitudinal axis 8 of the vehicle with an even larger impact surface being formed, as illustrated, for example, in the embodiment of FIG. 5.

The fourth outer wall 16 has a second outer surface 19 facing the contact surface 10 and connected to the contact surface 10 in an integrally bonded manner in sections with the aid of a weld seam. A further chamber 20 is formed between the second outer surface 19 and the contact surface 10.

The first outer surface 11 and the first outer wall 13 protrude over the second outer wall 14 and the third outer wall 15 in addition to over the contact surface 10. Thus, a web 21 that acts elastically in the event of an impact is formed on the deformation element 4.

A support wall 22 of the deformation element 4 is arranged parallel to a floor surface (not illustrated specifically) of the vehicle and connects the walls 17 to each other for improved absorption of a impulse force.

The chambers 12 of the deformation element 4 are preferably open in the direction of the longitudinal axis 8 of the vehicle in relation to the surroundings so that improved deformation or expansion during absorption of the impulse force is possible.

The first outer surface 11 has a spike 23 that is fastened to the first outer surface 11 symmetrically with respect to the transverse axis 7 of the vehicle and asymmetrically with respect to the longitudinal axis 5.

Figure 5:
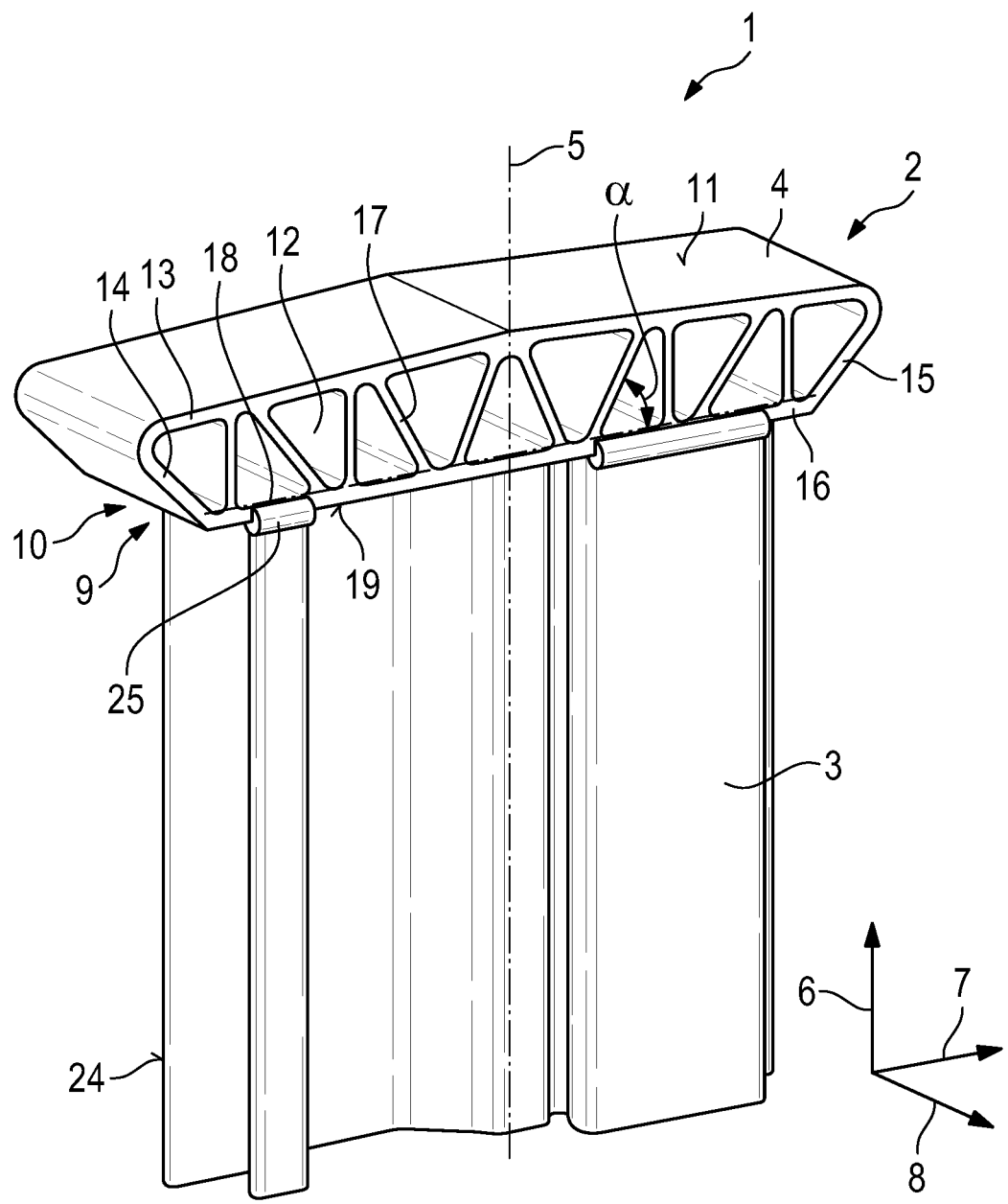
FIG. 5 is a perspective illustration of the deformation crossbar of the rollover protection system according to a second embodiment.

The second exemplary embodiment of the rollover protection system 1 is illustrated in FIG. 5 and has a deformation element 4 positioned with the aid of clip elements 25 and held on the profiled strut 3. In addition to the clip elements 25, the deformation element 4 can also be connected to the profiled strut 3 in an integrally bonded manner. The deformation element 4 can be positioned and held exactly on the profiled strut 3 with the aid of the clip elements 25.

To obtain a high impulse force absorption capability, the deformation element 4 has walls 17 extending in the direction of the longitudinal axis 5 in addition to the walls 17 positioned at an inclination to the normal 18. This increases a rigidity of the deformation element 4 with simultaneous absorption of high impulse forces with the aid of the walls 17 arranged at an inclination.

What is claimed is:

1. A rollover protection system for a motor vehicle, comprising: a profiled strut extending along a vertical axis of the vehicle, the profiled strut having a first end facing away from a floor of the motor vehicle; and a deformation element accommodated at the first end of the profiled strut, the deformation element having a first outer surface that faces away from the profiled strut and defining an impact surface, the deformation element defining a strut profile extending in a direction of a longitudinal axis of the motor vehicle and defining a hollow body having a plurality of chambers, the chambers being separated from one another by walls extending at an inclination angle of greater than or equal to 45° in relation to a normal of a longitudinal axis of the profiled strut, the hollow body further having a support wall extending substantially parallel to a floor surface of the vehicle and at least partially connecting the walls, and the profiled strut having a contact surface facing the deformation element and on which the deformation element is held, the deformation element at least partially matching an inner contour of the motor vehicle.

2. The rollover protection system of claim 1, wherein the deformation element is an extruded component, a forged part with corresponding ribbing, or a cast part.

3. The rollover protection system of claim 1, wherein the first outer surface protrudes over the contact surface.

4. The rollover protection system of claim 3, wherein the first outer surface protrudes over the contact surface in a direction of an interior of the motor vehicle and/or in the direction facing away from the interior.

5. The rollover protection system of claim 3, wherein the first outer surface protrudes over the contact surface in a direction of the longitudinal axis of the vehicle.

6. The rollover protection system of claim 1, wherein the deformation element has a second outer surface facing the profiled strut and connected to the contact surface in sections.

7. The rollover protection system of claim 6, wherein a further chamber is formed between the second outer surface and the contact surface.

8. The rollover protection system of claim 1, wherein an outer wall of the deformation element is formed at an inclination in relation to a longitudinal axis of the profiled strut.

9. The rollover protection system of claim 1, wherein the first outer surface protrudes over an outer wall of the deformation element.

10. The rollover protection system of claim 1, wherein the deformation element is connected to the profiled strut in an integrally bonded manner.

11. A rollover protection system for a motor vehicle, comprising: a profiled strut extending along a vertical axis of the vehicle, the profiled strut having a first end facing away from a floor of the motor vehicle; and a deformation element accommodated at the first end of the profiled strut, the deformation element having a first outer surface that faces away from the profiled strut and defining an impact surface, a spike arranged on the first outer surface of the deformation element, the deformation element defining a strut profile extending in a direction of a longitudinal axis of the motor vehicle, and the profiled strut having a contact surface facing the deformation element and on which the deformation element is held, the deformation element at least partially matching an inner contour of the motor vehicle.

12. The rollover protection system of claim 11, the deformation element is a hollow body having a plurality of chambers.

13. The rollover protection system of claim 12, wherein the chambers are formed separately from one another with the aid of walls extending at an inclination in relation to a normal of a longitudinal axis of the profiled strut.

14. The rollover protection system of claim 13, wherein the inclination has an angle of greater than or equal to 45° in relation to the normal.

15. The rollover protection system of claim 13, further comprising a support wall extending substantially parallel to a floor surface of the vehicle and at least partially connecting the walls.

16. The rollover protection system of claim 11, wherein the first outer surface protrudes over the contact surface.

17. The rollover protection system of claim 16, wherein the first outer surface protrudes over the contact surface in a direction of an interior of the motor vehicle and/or in the direction facing away from the interior.

18. The rollover protection system of claim 16, wherein the first outer surface protrudes over the contact surface in a direction of the longitudinal axis of the vehicle.

19. The rollover protection system of claim 11, wherein the deformation element has a second outer surface facing the profiled strut and connected to the contact surface in sections.

20. The rollover protection system of claim 19, wherein a further chamber is formed between the second outer surface and the contact surface.

* * * * *